(12) United States Patent
Beneke et al.

(10) Patent No.: US 12,500,374 B2
(45) Date of Patent: Dec. 16, 2025

(54) ROTATABLE CABLE OUTLET PIECE FOR A PLUG CONNECTOR HOUSING

(71) Applicant: HARTING ELECTRIC STIFTUNG & CO. KG, Espelkamp (DE)

(72) Inventors: Andre Beneke, Vechta (DE); Markus Wittpahl, Hüllhorst (DE)

(73) Assignee: HARTING ELECTRIC STIFTUNG & CO. KG, Espelkamp (DE)

( * ) Notice: Subject to any disclaimer, the term of this patent is extended or adjusted under 35 U.S.C. 154(b) by 392 days.

(21) Appl. No.: 18/044,555

(22) PCT Filed: Sep. 1, 2021

(86) PCT No.: PCT/DE2021/100725
§ 371 (c)(1),
(2) Date: Mar. 8, 2023

(87) PCT Pub. No.: WO2022/053106
PCT Pub. Date: Mar. 17, 2022

(65) Prior Publication Data
US 2023/0335944 A1    Oct. 19, 2023

(30) Foreign Application Priority Data
Sep. 11, 2020   (DE) ..................... 10 2020 123 691.3

(51) Int. Cl.
*H01R 13/58*   (2006.01)
*H01R 13/56*   (2006.01)
(Continued)

(52) U.S. Cl.
CPC ....... *H01R 13/5841* (2013.01); *H01R 13/565* (2013.01); *H01R 35/04* (2013.01); *H02G 3/18* (2013.01)

(58) Field of Classification Search
CPC .. H01R 13/5841; H01R 13/565; H01R 35/04; H01R 35/00; H01R 35/02
See application file for complete search history.

(56) References Cited

U.S. PATENT DOCUMENTS

| 5,822,226 A | 10/1998 | Watkins et al. |
| 5,882,226 A * | 3/1999 | Bell ............... H01R 13/567 |
| | | 439/11 |

(Continued)

FOREIGN PATENT DOCUMENTS

| CN | 203 553 456 U | 4/2014 |
| CN | 109 565 163 A | 4/2019 |

(Continued)

OTHER PUBLICATIONS

International Search Report and Written Opinion, mailed Dec. 13, 2021, for International Patent Application No. PCT/DE2021/100725. (12 pages) (with English translation of International Search Report).

(Continued)

*Primary Examiner* — Renee S Luebke
*Assistant Examiner* — Paul D Baillargeon
(74) *Attorney, Agent, or Firm* — Seed Intellectual Property Law Group LLP

(57) ABSTRACT

A plug connector housing is provided having a cable through-opening with a substantially circular cross-section. The plug connector housing has a cable outlet piece, which substantially has the shape of an angled cylinder. The cable outlet piece is configured to be fastened to the cable through-opening of the plug connector housing and is mounted for rotation in a peripheral direction relative to the cable through-opening.

10 Claims, 2 Drawing Sheets

(51) Int. Cl.
*H01R 35/04* (2006.01)
*H02G 3/18* (2006.01)

(56) References Cited

U.S. PATENT DOCUMENTS

| | | | |
|---|---|---|---|
| 6,338,645 | B1 | 1/2002 | Tan et al. |
| 6,341,969 | B1 | 1/2002 | Taniuchi et al. |
| 9,553,395 | B2 * | 1/2017 | Nagasaki ................ H01R 4/30 |
| 2006/0094285 | A1 | 5/2006 | Newell |
| 2015/0349455 | A1 * | 12/2015 | Kern ................ H01R 13/5841 |
| | | | 29/857 |
| 2017/0077640 | A1 | 3/2017 | Diessel et al. |
| 2017/0162978 | A1 | 6/2017 | Glasker et al. |
| 2021/0131472 | A1 | 5/2021 | Schlegel et al. |
| 2021/0210904 | A1 * | 7/2021 | Pacher ................ H01R 35/00 |

FOREIGN PATENT DOCUMENTS

| | | |
|---|---|---|
| DE | 69716176 T2 | 8/2003 |
| DE | 102013102886 A1 | 9/2014 |
| DE | 102014102930 A1 | 9/2015 |
| DE | 102017118918 A1 | 2/2019 |
| WO | 2018122048 A1 | 7/2018 |

OTHER PUBLICATIONS

Office Action, dated Jun. 29, 2021, for German Patent Application No. 10 2020 123 691.3 (7 pages).
International Preliminary Report on Patentability, dated Mar. 7, 2023, for International Patent Application No. PCT/DE2021/100725. (7 pages).

\* cited by examiner

ROTATABLE CABLE OUTLET PIECE FOR A PLUG CONNECTOR HOUSING

BACKGROUND

Technical Field

The disclosure is directed to a plug connector housing.

Such plug connector housings are used in particular in harsh industrial environments. The plug connectors used here must be particularly robust and, at the same time, adaptable to the available installation space. They are therefore also referred to as heavy-duty plug connectors.

Description of the Related Art

A plug connector housing having a fixed and angled cable outlet is known from DE 10 2017 118 918 A1. In this, the cables are routed away from the plug connector housing in a particular outlet direction. Different plug connector housings are used depending on the operating requirement.

DE 10 2013 102 886 A1 discloses a clip-on bracket for a cable outlet of a plug connector. The bending angle of the cable may be altered via the clip-on bracket and an angled cable outlet may thus be achieved.

The clip-on bracket is designed as a separate component and may become easily damaged or lost in harsh industrial environments. Moreover, the bending force of the clip-on bracket is limited, which means that cables with a large diameter cannot be bent thereby.

The German Patent and Trademark Office has searched the following prior art in the priority application relating to the present application: DE 10 2014 102 930 A1 and U.S. Pat. No. 6,338,645 B1.

BRIEF SUMMARY

Embodiments of the invention provide a robust and flexible plug connector housing, which can be flexibly adapted to the installation environment.

The plug connector housing according to an embodiment of the present invention has a cable through-opening with a substantially circular cross section. "Substantially circular" means that the cross section may also have an oval form, for example. It is merely important that the cable through-opening has no sharp edges which could damage the cable sheath of a connected cable.

The plug connector housing has a cable outlet piece, which substantially has the form of an angled cylinder. The cable outlet piece is a component of the plug connector housing. The cable outlet may be geometrically described by two cylindrical bodies which are assembled with the aid of a miter crosscut. It may also be said that the cable outlet piece has a bending angle. The bending angle is included by the main axes of symmetry of the assembled cylindrical bodies described above.

As a result of an angled cable outlet piece, the connected cable also exits the plug connector housing or the plug connector at an angle. This may provide space-related benefits in many installation situations. In particular, if a plug connector is connected to a machine wall, the cable may be routed away upwards, downwards, to the right or to the left in a space-saving manner.

The cable outlet piece is fastened on the cable through-opening. At the same time, it is mounted for rotation in a circumferential direction. As a result of the rotatability, the cable outlet direction (left, right, up or down) may be flexibly selected. There is no need to provide specific plug connector housings with specific outlet directions. As a result, in addition to the flexible usability, the storage for such plug connector variants is reduced.

The cable through-opening preferably has a collar, which protrudes from the plug connector housing and has at least one fastening opening, wherein the fastening opening is arranged in the lateral surface of the collar. The cable outlet piece has a circumferential groove on an outside of the cable outlet piece, wherein a ring is placed in the groove and mounted for rotation in the circumferential direction. The ring has at least one radially protruding fastening stud, wherein the at least one fastening stud engages in the at least one fastening opening of the collar. The cable outlet piece can thus be fastened on the cable through-opening of the plug connector housing and is mounted for rotation in the circumferential direction.

The collar advantageously has a substantially cylindrical lateral surface. Such a geometry may be easily provided in an injection molding or die casting process. The plug connector housing may be made from plastic, but also from metal (e.g., die cast zinc or die cast aluminum).

In a particularly advantageous embodiment of the invention, the collar of the cable through-opening has two opposing fastening openings. The ring correspondingly has at least two radially protruding fastening studs. The fastening studs each engage in a fastening opening associated therewith. This variant has been shown to be particularly robust and reliable.

The cable through-opening may have at least one internal step, but advantageously two opposing internal steps. The cable outlet piece correspondingly has at least one axially protruding lug, but advantageously two opposing axially protruding lugs. Upon a radial rotation in the circumferential direction of the cable outlet piece, the lugs are guided towards the steps. The rotation of the cable outlet piece is thus limited mechanically. The step accordingly represents a stop edge for the lug. The step and lug, or steps and lugs, together form a rotation-angle limit.

The steps advantageously each have the above-mentioned fastening opening. The steps, which may be designed to be very narrow overall, therefore require less installation space. The possible rotation angle for the cable outlet piece may be set via the width of the steps as seen in the circumferential direction. The wider the step, the more limited the rotation angle, and vice versa. In conjunction with the lugs, the steps function as radial rotation limits for the cable outlet piece. The rotation angle may be between 120° and 60°, wherein the thresholds are included in the interval.

The cable outlet piece may have an angled design. The bending angle may be between 140° and 90°. This means that the direction vector of its cable insertion direction and the direction vector of its cable outlet direction may include an angle between 140° and 90°, wherein the boundary regions are included in the claimed angular interval. All possible applications of the plug connector housing are sufficiently covered by these angular ranges. The cables may be routed away at an obtuse angle—without too great a cable bend. However, a more pronounced bend at a right angle may likewise be realized.

The plug connector housings according to embodiments of the present invention may be used in so-called heavy-duty plug connectors, also known as industrial plug connectors. Such plug connector housings may have a base portion with a substantially rectangular cross section.

BRIEF DESCRIPTION OF THE SEVERAL VIEWS OF THE DRAWINGS

An embodiment of the disclosure is illustrated in the drawings and will be explained in more detail below. In the drawings.

The figures may contain partially simplified, schematic illustrations. Identical reference signs are sometimes used for similar, but possibly not identical, elements. Different views of similar elements may be drawn to different scales. Directional information, for example "left," "right," "up" and "down" are to be understood in relation to the respective figure and may vary with respect to the object shown in the individual illustrations.

DETAILED DESCRIPTION

Figure 1:
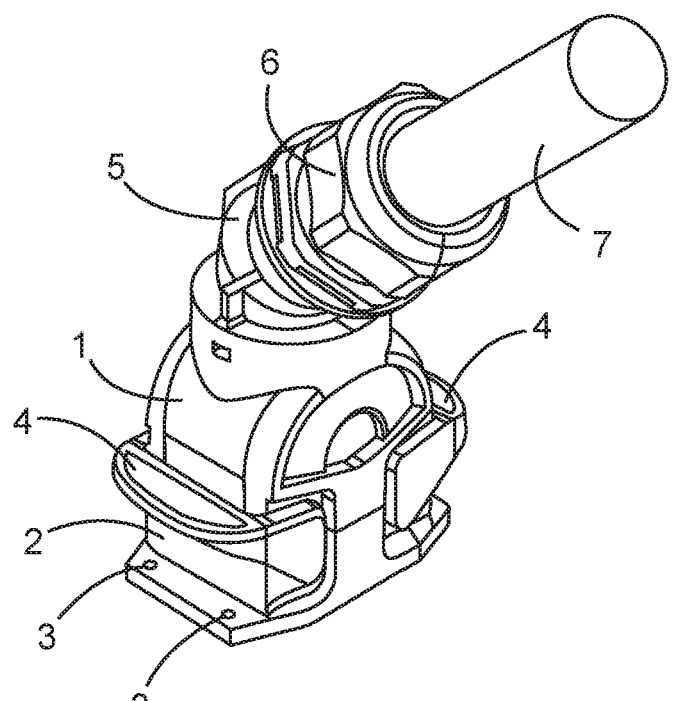
FIG. 1 shows a perspective illustration of a heavy-duty plug connector with an inventive plug connector housing.

FIG. 1 shows a perspective illustration of a heavy-duty plug connector with an inventive plug connector housing 1. The plug connector is inserted into a so-called mounting flange 2. Such a mounting flange 2 is located for example on a device wall (not shown) and is secured thereto via screw openings 3.

To fasten the plug connection, the mounting flange 2 has two pivotable locking clips 4, which are laterally mounted on narrow sides of the mounting flange 2 and reach over respective locking pins (not shown) of the plug connector housing 1.

The plug connector housing 1 has a cable outlet piece 5, on which a cable gland 6 for fastening and strain-relief of the connected cable 7 is located at a cable outlet end.

Figure 2:
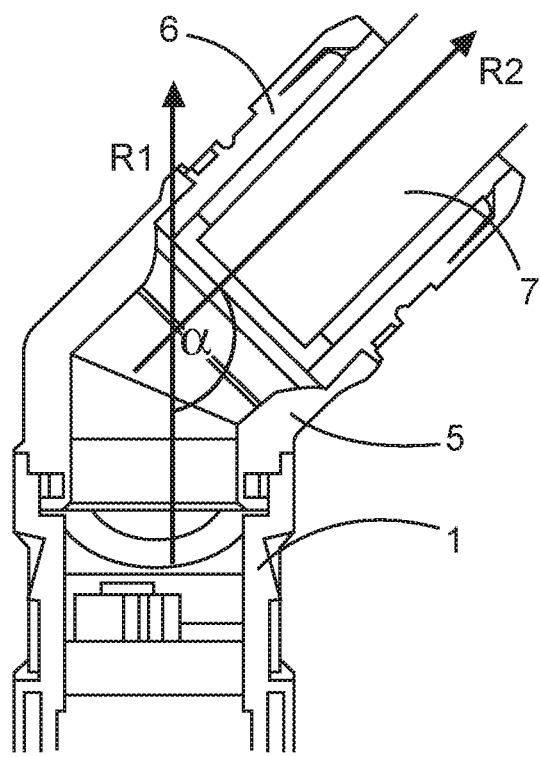
FIG. 2 shows a sectional partial view of the plug connector housing in the region of the cable outlet piece.

It can be seen in FIG. 2, for example, that the cable outlet piece 5 substantially has the form of an angled cylinder. This means that the cable outlet piece 5 firstly extends linearly in a cable outlet direction of the plug connector housing 1 and then bends in a direction which deviates therefrom. With continued reference to FIG. 2, the cable 7 exits the plug connector housing 1 firstly in the direction R1 and then subsequently bends in the direction R2. The direction vectors R1 and R2 include a bending angle α. The bending angle α may be between 140° and 90° in some embodiments.

The cable outlet piece 5 can be fastened on the cable through-opening 8 of the plug connector housing 1 and is mounted for rotation in a circumferential direction relative to the cable through-opening 8. The direction of rotation is denoted by the double-headed arrow 9 in FIG. 3.

Figure 4:
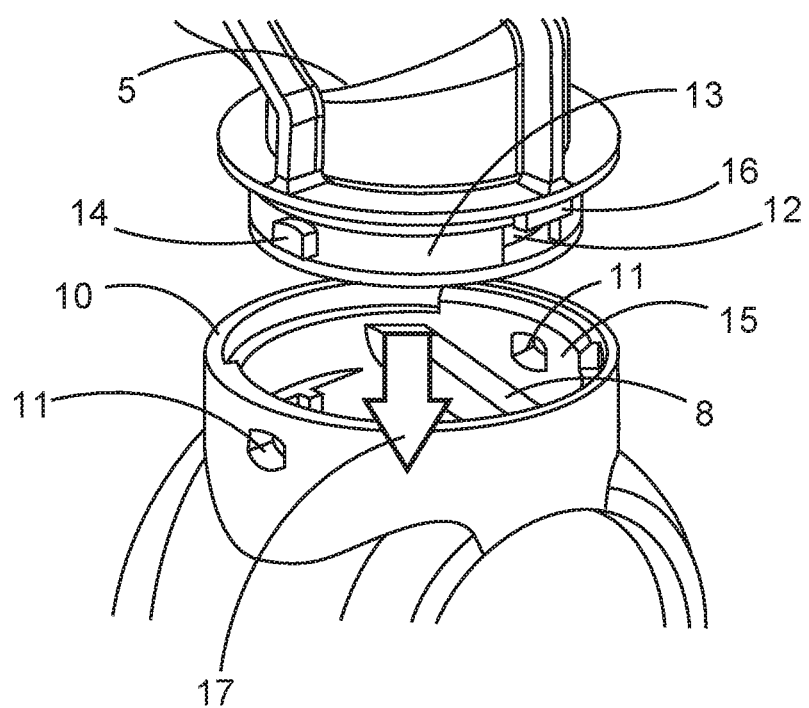
FIG. 4 shows an exploded drawing of a detail of the inventive plug connector housing.

The functional elements for the rotatability of the cable outlet piece 1 are explained with reference to FIG. 4. The cable through-opening 8 has a collar 10, which protrudes from the plug connector housing 1 and in which two opposing fastening openings 11 are integrally formed.

The cable outlet piece 5 has a circumferential groove 12 on an outside in the lower connection region of the cable outlet piece 5. A ring 13 is placed into this groove 12, wherein the friction coefficient between the surface of the groove 12 and the inside of the ring 13 is selected such that the ring 13 is mounted in the groove 12 for rotation in the circumferential direction. The cable outlet piece 5 latches with the plug connector housing 1 in the direction of the arrow 17.

The ring 13 has two opposing, radially protruding fastening studs 14. However, for illustrative purposes, only one fastening stud 14 can be seen in FIG. 4. The fastening studs 14 each engage in a respective fastening opening 11, whereby the cable outlet piece 5 is fastened on the cable through-opening 8 of the plug connector housing 1. As a result of the rotatability of the ring 13, the entire cable outlet piece 5 is mounted on the cable through-opening 8 of the plug connector housing 1 for rotation in the direction of the double-headed arrow 9 (circumferential direction).

Two opposing internal steps 15 are provided in the cable through-opening 8. The fastening opening 11 is incorporated in these steps 15. The cable outlet piece 5 has two opposing, axially protruding fastening studs 16 on an outside of the cable outlet piece 5. Upon the rotation of the cable outlet piece 5, the lugs 16 of the cable outlet piece 5 are rotated towards a respective step 15 of the cable through-opening 8, whereby a rotation limit is realized. A rotation limit is needed in particular so that the connected cable 7 is not subject to too great a torsion, whereby it might become damaged.

Figure 3:
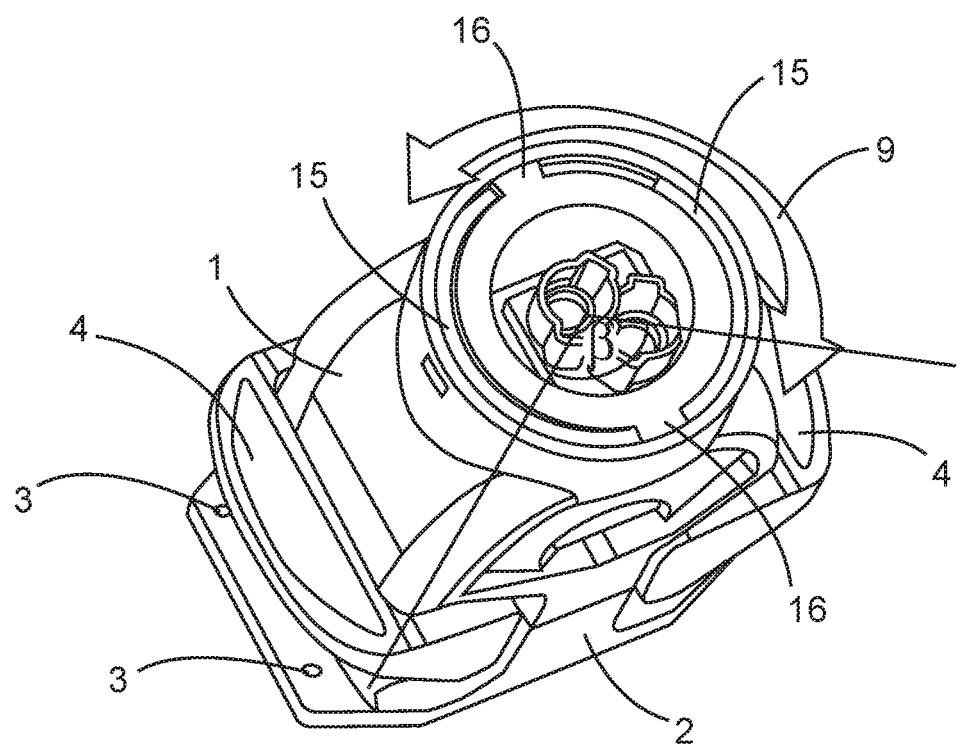
FIG. 3 shows a sectional perspective plan view of the inventive plug connector housing.

FIG. 3 shows the rotation angle β through which the cable outlet piece 5 can be rotated relative to the plug connector housing 1 or to the cable through-opening 8. It has been shown that an angle β between 120° and 60° is sufficient.

Even where combinations of different aspects or features of embodiments of the invention are shown in the figures in each case, it is clear to a person skilled in the art—unless indicated otherwise—that the combinations shown and discussed are not the only possible combinations. In particular, mutually corresponding units or feature complexes from different embodiments may be interchanged with each other. Put another way, aspects of the various embodiments described above can be combined to provide further embodiments.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A plug connector housing, comprising:
   a base housing having a cable through-opening with a substantially circular cross section, the cable through-opening including a collar that protrudes from an upper end of the base housing and has at least one fastening opening;
   a cable outlet piece, which substantially has the form of an angled cylinder, wherein the cable outlet piece is configured to be fastened to the cable through-opening of the base housing and is mounted for rotation in a circumferential direction relative to the cable through-opening, and wherein the cable outlet piece has a circumferential groove on an outside of the cable outlet piece; and
   a ring mounted in the circumferential groove of the cable outlet piece for rotation in the circumferential direction, the ring having at least one radially protruding fastening stud that engages in the at least one fastening opening of the collar of the cable through-opening of the base housing.

2. The plug connector housing as claimed in claim 1, wherein the cable outlet piece is rotatable in a rotation angle between 120° and 60° relative to the cable through opening.

3. The plug connector housing as claimed in claim 1, wherein the collar has a substantially cylindrical lateral surface.

4. The plug connector housing as claimed in claim 1, wherein:
- the collar of the cable through-opening has two opposing fastening openings,
- the ring has at least two radially protruding fastening studs, and
- the fastening studs each engage in a respective one of the fastening openings.

5. The plug connector housing as claimed in claim 1, wherein the cable through-opening has at least one internal step.

6. The plug connector housing as claimed in claim 5, wherein each of the at least one step have a respective fastening opening.

7. The plug connector housing as claimed in claim 5, wherein the cable outlet piece has at least one axially protruding lug.

8. The plug connector housing as claimed in claim 7, wherein each of the at least one axially protruding lug of the cable outlet piece is rotatable towards a respective step of the cable through-opening.

9. The plug connector housing as claimed in claim 1, wherein the cable outlet piece has a bending angle between 140° and 90°.

10. The plug connector housing as claimed in claim 1, wherein a base portion of the base housing of the plug connector housing has a substantially rectangular cross section.

* * * * *